(12) United States Patent  (10) Patent No.: US 7,752,097 B2
Gallon  (45) Date of Patent: *Jul. 6, 2010

(54) METHODS, SYSTEMS AND ARTICLES OF MANUFACTURE FOR MANAGING PENALTY FEES FOR FINANCIAL ACCOUNTS

(75) Inventor: Genay Nicole Gallon, Hopewell, VA (US)

(73) Assignee: Capital One Financial Corporation, Falls Church, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/153,562

(22) Filed: May 21, 2008

(65) Prior Publication Data

US 2009/0070244 A1  Mar. 12, 2009

Related U.S. Application Data

(63) Continuation of application No. 10/271,984, filed on Oct. 17, 2002, now Pat. No. 7,386,501.

(60) Provisional application No. 60/329,534, filed on Oct. 17, 2001.

(51) Int. Cl.
  *G07F 19/00*  (2006.01)
  *G06Q 40/00*  (2006.01)

(52) U.S. Cl. .............................. 705/34; 705/37; 705/38
(58) Field of Classification Search .................. 705/35, 705/38, 39, 40, 44
See application file for complete search history.

(56) References Cited

U.S. PATENT DOCUMENTS 4,114,601 A * 9/1978 Abels ......................... 600/20

(Continued)

FOREIGN PATENT DOCUMENTS

WO  WO 99/27479  6/1999

(Continued)

OTHER PUBLICATIONS

VA product design heads towards diversity, Koco, Linda, National Underwriter (Life/Health/Financial Services), Apr. 19, 1999, vol. 103, Iss. 16, pp. 19-22.*

(Continued)

*Primary Examiner*—Matthew S Gart
*Assistant Examiner*—Talia Crawley
(74) *Attorney, Agent, or Firm*—Finnegan, Henderson, Farabow, Garrett & Dunner, L.L.P.

(57) ABSTRACT

Methods, systems, and articles of manufacture are disclosed for providing a payment plan to credit card customers. A customer may be offered membership into a payment plan that allows the customer to pay past due penalty fees included in a balance associated with the customer's credit card account. Once a customer is member of the plan, a new segment is created for the customer's account. The penalty fees are removed from the balance and applied to a balance associated with the new segment. Thereafter, each time payment is received for the financial account, the payment may be applied in whole or part to the new segment's balance until it reaches zero. Subsequent payments are applied to the balance of the financial account. In one configuration, the financial account may not be charged any penalty fees while the customer is a member of the plan.

15 Claims, 4 Drawing Sheets

U.S. PATENT DOCUMENTS

| | | | | |
|---|---|---|---|---|
| 5,190,059 | A * | 3/1993 | Fabian et al. | 128/899 |
| 5,523,942 | A * | 6/1996 | Tyler et al. | 705/4 |
| 5,673,402 | A * | 9/1997 | Ryan et al. | 705/38 |
| 5,931,824 | A * | 8/1999 | Stewart et al. | 604/358 |
| 5,933,817 | A * | 8/1999 | Hucal | 705/39 |
| 6,032,134 | A * | 2/2000 | Weissman | 705/40 |
| 6,038,552 | A * | 3/2000 | Fleischl et al. | 705/44 |
| 6,052,674 | A * | 4/2000 | Zervides et al. | 705/40 |
| 6,076,007 | A * | 6/2000 | England et al. | 600/424 |
| 6,298,335 | B1 * | 10/2001 | Bernstein | 705/40 |
| 6,366,206 | B1 * | 4/2002 | Ishikawa et al. | 340/573.1 |
| 6,400,272 | B1 * | 6/2002 | Holtzman et al. | 340/572.1 |
| 6,424,262 | B2 * | 7/2002 | Garber et al. | 340/572.3 |
| 6,532,450 | B1 * | 3/2003 | Brown et al. | 705/40 |
| 7,003,491 | B2 * | 2/2006 | Starkman | 705/38 |
| 2002/0067263 | A1 * | 6/2002 | Tafoya et al. | 340/572.1 |
| 2002/0123946 | A1 * | 9/2002 | Haworth et al. | 705/35 |
| 2002/0123962 | A1 * | 9/2002 | Bryman et al. | 705/39 |
| 2002/0138409 | A1 * | 9/2002 | Bass | 705/38 |
| 2003/0033245 | A1 * | 2/2003 | Kahr | 705/39 |
| 2006/0271470 | A1 * | 11/2006 | McNamar et al. | 705/37 |

FOREIGN PATENT DOCUMENTS

WO    WO 01/74754 A1    10/2001

OTHER PUBLICATIONS

Variable Annuities: Hot but not for Everyone, Waggoner, John, USA Today (US), Nov. 17, 1995. Final Edition, Money Section; p. 04B.*

* cited by examiner

METHODS, SYSTEMS AND ARTICLES OF MANUFACTURE FOR MANAGING PENALTY FEES FOR FINANCIAL ACCOUNTS

This is a continuation of application Ser. No. 10/271,984, filed Oct. 17, 2002 U.S. Pat. No. 7,386,501 (now allowed) and claims the benefit of U.S. provisional application no. 60/329,534, filed Oct. 17, 2001 all of which are incorporated herein by reference.

CROSS REFERENCE TO RELATED APPLICATION

This application is related to and claims the benefit of priority under 35 U.S.C. 119(e) to U.S. Provisional Patent Application No. 60/329,534, filed on Oct. 17, 2001, the disclosure of which is expressly incorporated herein by reference in its entirety.

BACKGROUND OF THE INVENTION

I. Field of the Invention

The present invention generally relates to credit card products and, more particularly, relates to systems, methods, and articles of manufacture for managing penalty fees for financial accounts.

II. Background and Material Information

Credit card products have become so universally well known and ubiquitous that they have fundamentally changed the manner in which financial transactions and dealings are viewed and conducted in society today. Credit card products are most commonly represented by plastic card-like members that are offered and provided to customers through financial account providers, such as banks and other financial institutions. With a credit card, an authorized customer or cardholder is capable of purchasing services and/or merchandise without an immediate, direct exchange of cash. Instead, with each purchase, the cardholder incurs debt to their credit card account, which the cardholder may thereafter pay upon receipt of a periodic account statement. In most cases, the cardholder will have the option to either fully pay the outstanding balance or, as a matter of necessity or choice, defer at least a portion or the balance for later payment. For cardholders electing to defer payment, financial account providers typically assess interest or finance charges for the period during which payment of the outstanding debt is deferred.

Financial account providers assess penalty fees on customer accounts based on, for example, past due payments and overlimit charges. Delinquent cardholders or customers can cost financial account providers millions or even billions of dollars in revenue if payment can not be recovered. Furthermore, the financial ramifications on the delinquent cardholder is costly as well. For instance, issuers often charge customers penalty fees each payment period the customer has failed to make a timely payment or reduce an overlimit credit balance on an account. Together with interest charges and principal balance payments on the account, penalty fees may be more than a customer can financially handle. This may cause the customer to be late in making payments or even ignore payment deadlines.

Most financial account providers do not merely wait for delinquent customers to pay their debt. Instead, to recover all or a portion of the debt, providers employ various tactics to collect payments from their delinquent customers. Many financial account providers initially make an effort to collect overdue payments using some type of reminder, such as a letter or a phone call. Initial efforts are usually non-confrontational in instances where there has been a misunderstanding, such as the customer erroneously believing that all debt was previously paid or the financial account provider not receiving payments that actually were sent by the customer. A financial account provider often will receive payments from some customers in response to such a reminder. For other customers, however, this reminder may not be sufficient and their debts will remain unpaid despite the initial non-confrontational reminder(s).

Accounts that remain overdue for a lengthy period of time may be designated as a charged-off account. A charged-off account is an account on which a customer has not made a payment for a predetermined time period. Financial account providers consider charged-off accounts "written off" from their books (e.g., no longer receivable). Financial account providers may continue to attempt collection on charged-off accounts, but customers may no longer use the account to create further debt.

If initial collection efforts fail, some financial account providers resort to using debt collection agencies to collect payments from delinquent customers. For example, a credit issuer may give a number of charged-off accounts to a collection agency, while retaining ownership of the accounts. When customers provide payments to the agency, the agency keeps a percentage (e.g., 50%) and forwards the remainder to the financial account provider. Financial account providers may also try selling a portfolio of charged-off accounts to a collection agency. Under this arrangement, the agency essentially buys the portfolio for a fraction of the debt amount (e.g., less than one cent per dollar) and attempts collection on the account. Accordingly, a customer then owes the debt collecting agency instead of the original financial account provider. However, the practice of selling portfolios of charged-off debt and managing the charged-off accounts is expensive for the financial account provider and may jeopardize relationships with customers.

SUMMARY OF THE INVENTION

Accordingly, there is a need for improved methods, systems, and articles of manufacture for collecting payments on delinquent financial accounts. There is also a need for a framework to prevent delinquent financial accounts from becoming charged-off, while maintaining viable payment options for customers associated with these delinquent accounts.

Methods, systems, and articles of manufacture consistent with embodiments of the present invention enable a financial account provider to provide a payment plan to customers who have credit card accounts that have past due payments and/or a balance that is over a credit limit. A customer who accepts membership into the plan may have their credit card account modified with a new segment where past due penalty fees associated with the customer's account is placed. The financial account provider may allow payments directed to the customer's account to be charged to the new segment, while at the same time not assessing additional penalty fees that the customer's account may be eligible to receive. Once the past due penalty fees are paid off according to a payment schedule determined in the payment plan, subsequent payments may be credited towards the principal balance of the customer's account. Thus, the financial account provider may adjust a status associated with customer's account from delinquent to non-delinquent based on monitored payment activities of the customer.

In one embodiment of the present invention, a financial account provider determines a set of target customers from which to offer membership into a payment plan. The financial account provider may extend offers to these target customers using a variety of communication channels. For each of the approved target customers that accepts the offer, the financial account provider may create a new segment for their respective credit accounts and transfer any outstanding penalty fees or amounts to the new segment. Also, additional penalty fees may be waived by the financial account provider while a customer is a member of the payment plan.

In another embodiment of the present invention, a financial account provider monitors the progress of the customer included in the payment plan to ensure he/she meets designated criteria, such as timely payments of selected amounts. The financial account provider may apply any received payments to the new segment until the penalty fees included therein are paid off. Afterwards, the financial account provider may direct any further payments to a principal balance associated with a primary segment of the customer's credit card account.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, illustrate various embodiments and aspects of the present invention. In the drawings.

DETAILED DESCRIPTION

Figure 1:
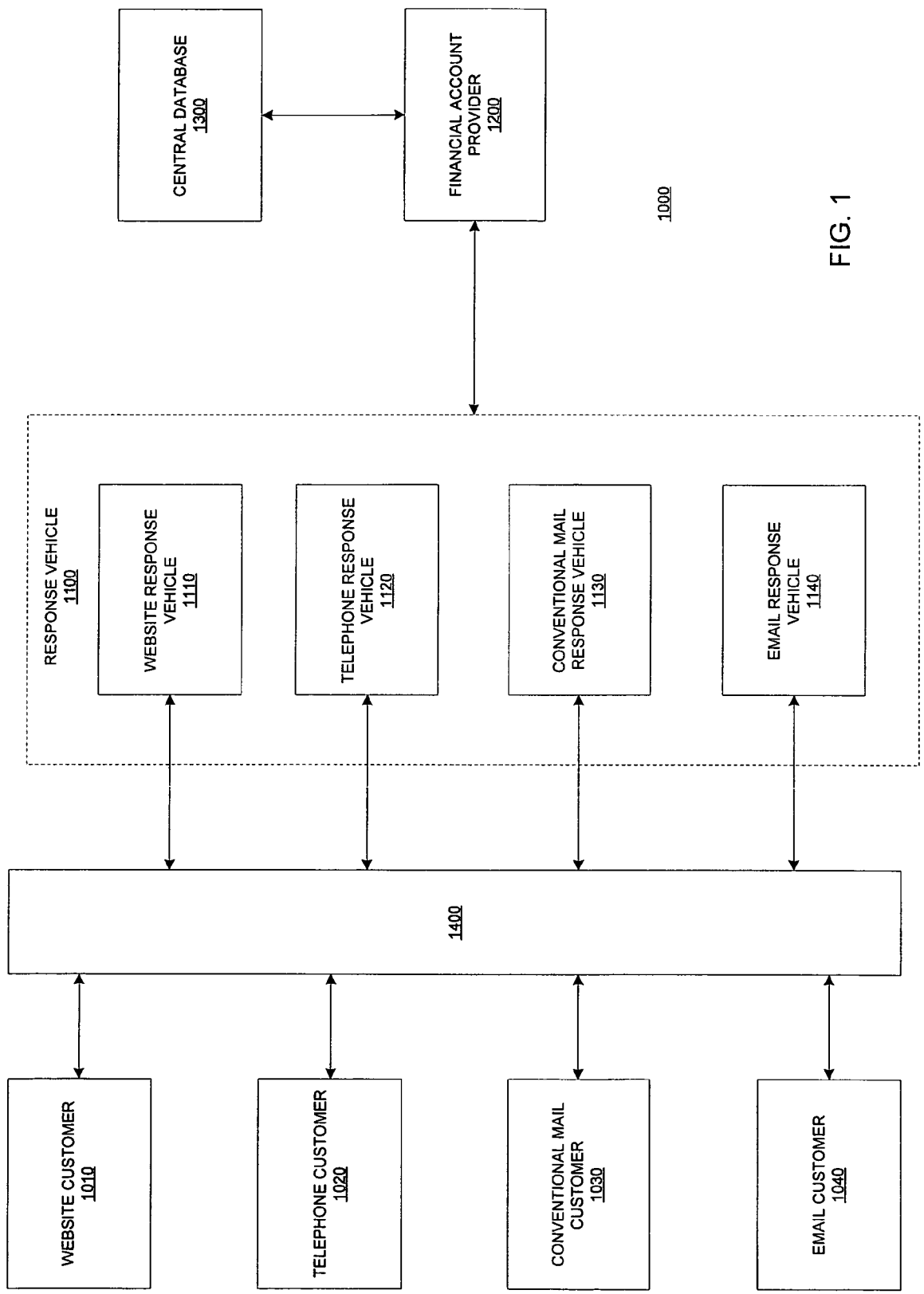
FIG. 1 illustrates an exemplary system environment for implementing certain embodiments of the present invention.

Reference will now be made in detail to exemplary embodiments of the invention, examples of which are illustrated in the accompanying drawings. Wherever possible, the same reference numbers will be used throughout the drawings to refer to the same or like parts.

Embodiments of the present invention are directed to methods, systems, and articles of manufacture for providing delinquent credit card customers an opportunity to gain membership into a payment plan offered by a financial account provider. The plan allows a customer to pay off outstanding penalty fees or amounts without being assessed additional fees that would normally be applied to their financial account. The financial account provider may monitor payment activities while the customer is a member of the payment plan to determine whether certain criteria associated with the selected plan have been met. If the customer fails to meet the criteria, their membership in the payment plan may be revoked, and the customer's account may be processed as a standard delinquent account with assessed penalty fees. On the other hand, if a customer meets the criteria (for example, within a predetermined time period), the financial account provider may provide benefits to the customer, such as removing a delinquent status associated with their account and establishing a good standing status once the customer removes any pending over credit limit balances.

The term "financial account," as used herein, refers to any type of financial possession associated with a user, such as a customer, and a provider, such as a bank or similar financial institution. For example, a financial account may represent a credit card account, a checking account, a loan account (e.g., mortgage, auto, etc.), etc. Further, as used herein, the term "penalty fees" encompasses any charges, assessments, amounts or fees that are applied against a financial account as a result of the occurrence of events that violate terms or conditions of the financial account. In the context of a credit card account, such events may include late or past due payments and/or overlimit charges. "Penalty fees" include individual or periodic charges, assessments, amounts or fees.

Embodiments of the present invention may be implemented in various environments. Such environments and related applications may be specially constructed for performing the various processes and operations of embodiments of the invention or they may include a general purpose computer or computing platform selectively activated or reconfigured by program code to provide the necessary functionality. The exemplary methods disclosed herein are not inherently related to any particular computer or other apparatus, and aspects of these processes may be implemented by a suitable combination of hardware, software, and/or firmware. For example, various general purpose machines may be used with programs written in accordance with teachings of the invention, or it may be more convenient to construct a specialized apparatus or system to perform the required methods and techniques.

The present invention also relates to computer readable media that include program instruction or program code for performing various computer-implemented operations based on embodiments of the methods and processes of the invention. The program instructions may be those specially designed and constructed for the purposes of the invention, or they may be of the kind well-known and available to those having skill in the computer software arts. Examples of program instructions include for example machine code, such as produced by a compiler, and files containing a high level code that can be executed by the computer using an interpreter.

FIG. 1 illustrates an exemplary system environment 1000, in which certain embodiments and features of the invention may be implemented. As illustrated in FIG. 1, the system environment 1000 includes a plurality of customers (1010-1040), a response vehicle system 1100 including a plurality of different response vehicles (1110-1140), a financial account provider 1200, a central database 1300, and a communications channel 1400.

Each customer in system environment 1000 may be associated with a different customer category. For instance, customer 1010 may be a Web site customer that accesses and retrieves information through a Web site on the World Wide Web of the Internet. The Web site may be a branded Web site operated by one or more vendors, or may be a Web site operated by a financial account provider. Customer 1020 may be a telephone customer that accesses and receives information using conventional telephonic communication techniques and systems. This includes, for example, wireline and wireless telephony systems. Customer 1030 may be a conventional mail customer that accesses and receives information by conventional mail techniques and services. This includes, for example, a customer that is part of a financial account provider's mailing list. Finally, customer 1040 may be a customer that accesses and receives information using electronic mail services. Customer 1010-1040 may also represent entities (such as an individual, a group of individuals, corporate entities, or any combination thereof) that hold credit card accounts with the financial account provider 1200. The categories of customers illustrated in FIG. 1 are exemplary and should not be considered limiting. For example, a variety of different customer categories may also be implemented in environment 1000, such as customers using kiosk computers or personal digital assistants (PDAs), mobile phones, etc.

Response vehicle 1100 represents a system for handling communications between the customers 1010-1040 and financial account provider 1200. Response vehicle 1100 may be part of a financial account provider's network and, as shown in FIG. 1, include a plurality of response vehicles 1110-1140 that correspond to different categories of customers 1010-1040. Generally, each response vehicle may be responsible for handling communications to and from customers based on the customers' category. For example, telephone response vehicle 1120 handles telephonic communications between the customer 1020 and financial account provider 1200. Thus, in the event financial account provider 1200 wishes to solicit customers telephonically, response vehicle 1120 includes the necessary systems to support such operations including, for example, operators and telecommunications equipment to communicate with customers 1020. Response vehicle 1130, on the other hand, includes the necessary systems and organizations to handle conventional mail processing to and from customers 1030. Response vehicle system 1140 includes the necessary systems and organizations to process electronic mail transactions with customers 1040. Response vehicle system 1100 may receive responses from the customers and forward them to financial account provider 1200 for appropriate processing. Notifications to the customers also are performed from issuer 1200 to the customer through response vehicle 1100. The notifications may include, for example, messages indicating acceptance into a repayment plan offered by financial account provider 1200.

Communication channel 1400 facilitates communications between the various customers and response vehicle system 1100 illustrated in FIG. 1. Such communications may include communications related to offering and issuing lines of credit to selected customers. Communications channel 1400 may include, for example, a conventional mail distribution network such as that provided by the U.S. Postal Service, a telephony-based network, a local area network (LAN), a wide area network (WAN), a dedicated intranet, the Internet, and/or a wireless network. Further, any suitable combination of wired and/or wireless components and systems may be incorporated into communications channel 1400. Any suitable combination of point-to-point communications or networked communications may also be incorporated into communication channel 1400 to facilitate communication between the different entities illustrated in FIG. 1. Moreover, any part of communication channel 1400 may implemented through traditional infrastructures or channels of trade, to permit operations associated with credit card offers to be performed manually or in-person by the various entities illustrated in FIG. 1.

Financial account provider 1200 receives communication information from response vehicle system 1100 and processes it using central database 1300. Database 1300 may contain various information including credit information, potential customer lists, risk scores for potential and current customers, approved customers, credit limits for approved customers, vendor tables including merchant identification numbers, customer information, purchase information, authorization information, and/or settlement information. Issuer 1200 also sends information to response vehicle system 1100 for delivery to the appropriate customers. Financial account provider 1200 is responsible for providing various credit cards and establishing associated accounts. Financial account provider 1200 may include one or more of the following: a bank, an acquiring bank, a merchant bank, a merchant and/or any commercial institution capable of providing a financial account, such as a credit card account, consistent with exemplary embodiments and the features disclosed herein. Further, although FIG. 1 only illustrates one financial account provider 1200, it is of course possible that more than one financial account provider be provided in system environment 1000.

Figure 2:
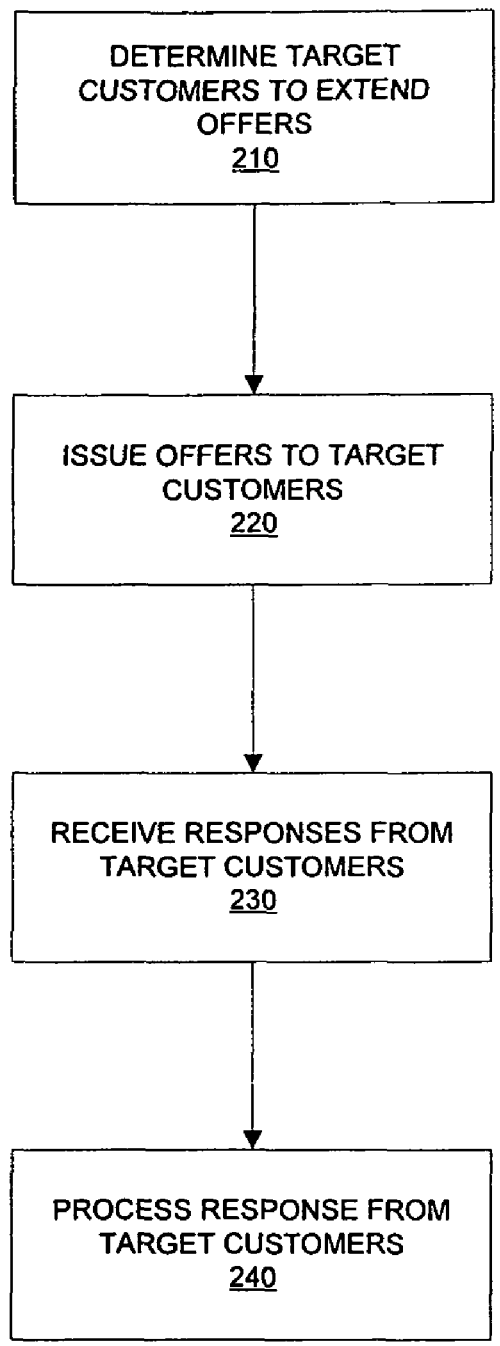
FIG. 2 is a flowchart of an exemplary method for offering target customers membership into a repayment plan, consistent with an embodiment of the present invention.

FIG. 2 illustrates an exemplary method associated with providing offers to target customers for membership into a payment plan consistent with an embodiment of the present invention. As illustrated in FIG. 2, financial account provider 1200 may identify specific target customers to receive a payment plan membership offer (Step 210). To identify target customers, financial account provider 1200 may consider several factors. Such factors may be based on the status of a customer's account. For example, financial account provider 1200 may be configured to extend offers to customer's whose credit card accounts are in a delinquent status. A delinquent status may reflect a condition where the issuer has assessed penalty fees for a credit card account with past due payments and/or overlimit charges. Past due fees may be associated with conditions where a customer has failed to make timely payments to be credited to their credit account for a predetermined period of time. Overlimit charges may be associated with conditions where an account has an outstanding balance that exceeds a predetermined credit limit. For example, for a credit card account with a credit limit of $400, a customer may have charged purchases above this credit limit, and financial account provider 1200 may assess penalty fees for every payment period the outstanding balance exceeds $400. One skilled in the art can appreciate that a number of different conditions may be considered by financial account provider 1200 to determine which credit card accounts are deemed to be in delinquent status, without departing from the embodiments and scope of the present invention.

Once card issuer 1200 has identified a target group of customers, it may generate a payment plan offer for each targeted selected customer. All of the targeted customers may receive the same payment plan offer or each customer may receive a personalized offer based specifically on conditions associated with the customer's account.

Once the payment plan offers are generated, they are sent to response vehicle system 1100 for distribution to the customers (Step 220). Each response vehicle in vehicle 1100 processes the offers in order to provide them to the customers through communication channel 1400. For instance, response vehicle 1110 formulates offers for generation and viewing on one or more Web pages or sites. The Web sites may be associated with a card issuer's Web site or sites that are operated by selected vendors. Once each response vehicle has processed the offers, they are sent to the specified customers for response.

Customers 1010-1040 may respond (accept or decline) to the payment plan offers using the same medium or channel associated with their category, or use a different communication medium. All of the responses from customers may be received by response vehicle system 1100 (Step 230), Where they are forwarded to be processed by financial account provider 1200 (Step 240).

Based on the category of a customer, responses may or may not be processed immediately. For instance, responses may be received and processed instantaneously and/or automatically for customers 1010 and 1020, while responses from customers 1030 may be delayed. For example, suppose a customer 1010 using a personal computer views a Web site operated by account provider 1200. The site may include a designated page that presents the customer with the payment plan membership offer determined by account provider 1200. The customer may decide to accept or decline the offer by merely selecting an icon representing their choice and perhaps providing credit information through the Web site. The response is then sent back to response vehicle 1110. Response vehicle 1110 processes the response and prepares it for presentation to account provider 1200. The response is processed by account provider 1200 and a notification may be sent back to customer 1010 through response vehicle 1110. The notification may indicate to the customer that their response to an offer has been processed and that their membership into the payment plan has been approved. The notifications may be displayed through a Web page that the customer was viewing when the offer was presented or on a separate Web page.

As can be seen, a customer who has accepted an offer through a Web site may receive immediate notification of an approval for a payment plan provided by financial account provider 1200. On the other hand, a customer who has been solicited by conventional mail, such as customer 1030, may respond to the offer by mailing back an acceptance form to the card issuer. The acceptance form may be received and processed by response vehicle 1130, and eventually processed by financial account provider 1200. Notification of an acceptance by financial account provider 1200 may then be sent back to the customer using the same conventional mail process.

There may be a plurality of variations available to account provider 1200 when communicating with customers. That is, a mail customer 1030 may wish to respond by telephone or through a Web site. Additionally, customers may respond by one medium, and request notification by another. For instance, a customer 1030 who has received an offer in the mail, may respond by mail, yet request notification by e-mail. Accordingly, a variety of user friendly options are available to customers for receiving and responding to the offers presented by card issuer 1200. The above descriptions are for illustration purposes alone and should not be viewed as limitations to embodiments of the present invention. One of ordinary skill in the art can appreciate that any number of combinations of communication techniques may be implemented, without departing from the embodiments of the present invention.

In one embodiment, the offers for membership into the payment plan may include indications of conditions and parameters associated with the plan that the customer might meet to maintain their membership. For example, a customer may be offered the opportunity to pay back outstanding penalty fees while financial account provider 1200 does not charge additional penalty fees for the customer's account being delinquent. That is, when a payment plan is associated with an account the financial account provider agrees not to charge its standard overlimit penalty fees even though the cardholder's balance of the account exceeds the credit limit for that account.

As a member of the payment plan, a customer may be required to meet certain criteria. For example, the customer may be required to make payments associated with their selected option within a set time period or the customer is removed from the payment plan. Also, financial account provider 1200 may also provide certain incentives to customers who accept membership into the payment plan. For example, financial account provider may associate an indicator with the customer's credit card account indicating that the customer is not to receive any phone calls or communications associated with collection activities for the past due amount while the customer is a member of the payment plan. Also, processing fees that may be assessed to electronic payment transactions over the Internet or telephone that are generally charged to a standard customer (i.e., those not on the repayment plan) may be waived by financial account provider 1200. Alternatively, financial account provider 1200 may reduce, or temporarily halt, interest rate charges to the customer's account while a member of the payment plan. One skilled in the art can appreciate that financial account provider 1200 may employ various incentives and criteria for the payment plan, without departing from the embodiments and scope of the invention.

Figure 3:
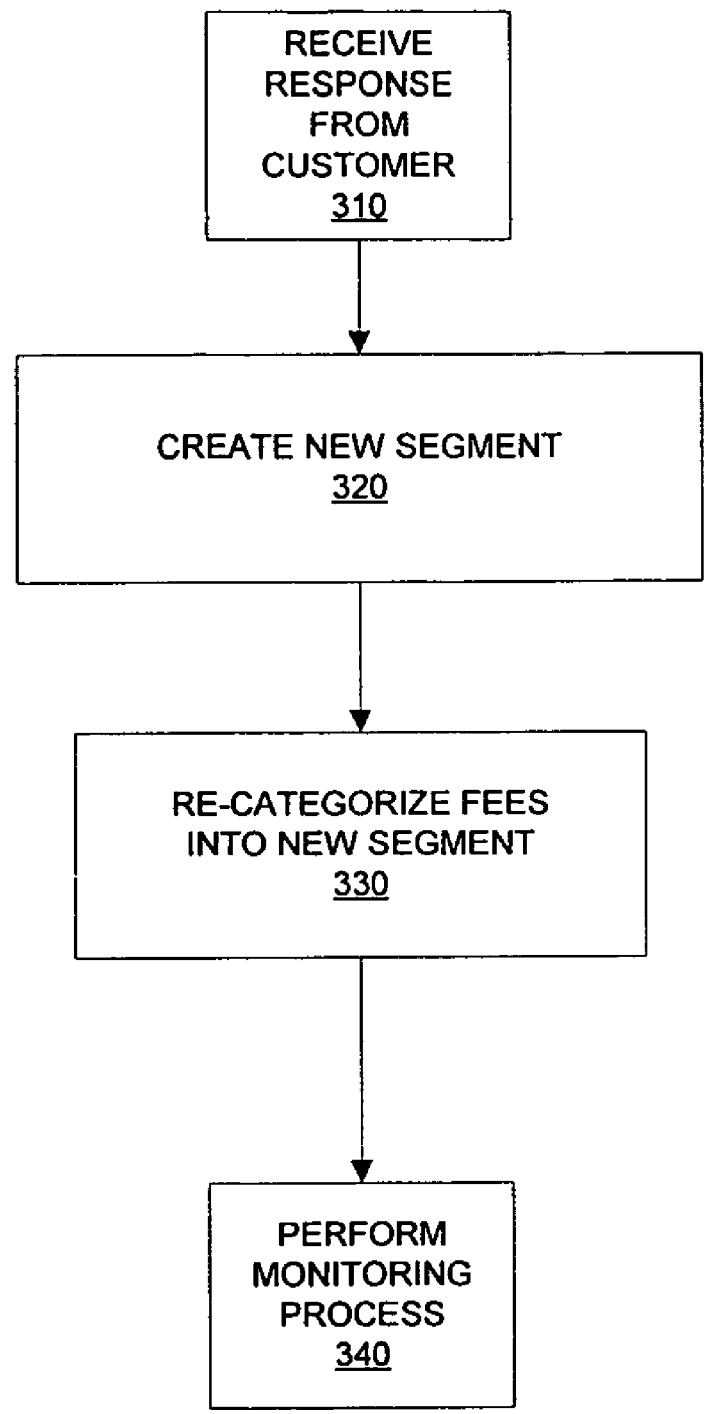
FIG. 3 is a flowchart of an exemplary method for processing responses from the target customer, consistent with an embodiment of the present invention.

FIG. 3 illustrates an exemplary method that may be performed when processing a target customer's acceptance of the offers described with respect to FIG. 2. As shown, financial account provider 1200 may receive a response from a target customer indicating their acceptance of an offered payment plan (Step 310). Once it receives their response, financial account provider 1200 may modify the customer's financial account to include a new segment (Step 320). A segment may be a data structure, such as a field, associated with a financial account stored in a file located in a memory device, such as central database 1300. For example, issuer 1200 may maintain an account file or record for each financial account. Each file or record may include one or more segments that each represent one or more credit lines and/or balances. Each segment may include its own parameters, such as balance, interest rates, penalty fee rates, payment periods, etc. A primary segment for an account may be associated with a primary line of credit from which standard financial account purchases are charged and payments received from a customer may be credited, such as standard credit card purchases. A secondary segment may also be associated with the same financial account and designated for other financial related functions, for example cash advances for a credit card account. The secondary segment may have its own line of credit, an interest rate different from the primary segment, and other parameters unique to the secondary segment. In one configuration, a new segment may be created that is associated with payment plan parameters. For example, the new segment may include its own interest rate that may be set at zero, or higher, perhaps up to and even exceeding the interest rate associated with the primary segment. A zero interest rate may be used by financial account provider 1200 if no interest fees are to be charged to the new segment.

Once the new segment is created, financial account provider 1200 may re-categorize any outstanding penalty fees associated with the customer's credit account into the new segment (Step 330). For example, suppose a customer has (i) a credit limit of $200, (ii) a total balance of $450 associated with a primary segment of the account, (iii) $100 of the total balance reflects past due fees, and (iv) another $100 reflects overlimit fees. Financial account provider 1200 may re-categorize the penalty fees by transferring $200 (representing selected penalty fees) into the new segment. Therefore, the total balance of the account would be $250, and the balance associated with the new segment would be $200. In one configuration, although the primary segment still has a $50 overlimit balance, financial account provider 1200 may waive any penalty fees charged to the primary segment, while the customer is a member of the payment plan. Therefore, the customer may concentrate on paying off the $200 associated with the new segment while not being assessed additional fees for penalties corresponding to the primary segment. In addition to creating the new segment, financial account provider 1200 may also set the parameters for the new segment, such as interest rates, payment periods, etc. Also, financial account provider 1200 may also reset any parameters associated with the primary credit line while the customer is a member in the payment plan. Once the customer's credit account has been re-categorized, selected fees halted, and the parameters for each segment set, or reset, financial account provider 1200 may perform a monitoring process (Step 340), consistent with embodiments of the invention.

Figure 4:
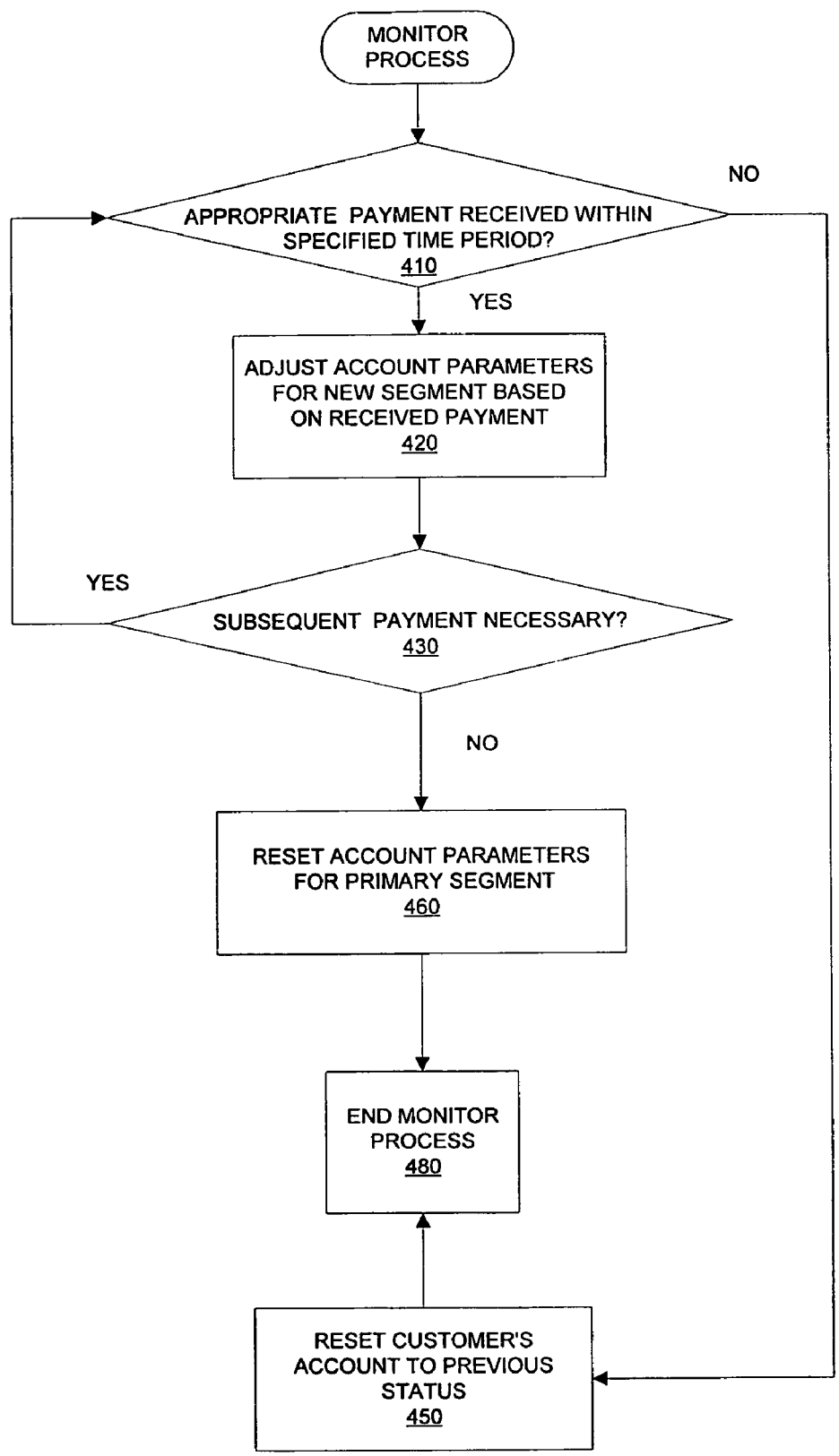
FIG. 4 is a flowchart of an exemplary monitoring method, consistent with an embodiment of the present invention.

FIG. 4 shows a flowchart of an exemplary monitoring method, consistent with an embodiment of the present invention. As illustrated in FIG. 4, financial account provider 1200 may determine whether an appropriate payment for the customer's account is received within a designated time period based on the payment plan associated with the customer (Step 410). If not (Step 410; NO), the customer has failed to meet a criteria set by financial account provider 1200 and the customer's credit card account may be reset to its previous status (Step 450), and the monitor process ends (Step 480). Alternatively, financial account provider 1200 may set the status of the customer's account to a delinquent status in Step 450. One skilled in the art can appreciate that financial account provider 1200 may be configured to perform various other tasks in the event a customer has failed to meet selected criteria while a member of the repayment plan, without departing from the embodiment sand scope of the present invention. For example, a report to a credit bureau may be provided that indicates the customer's delinquent status. Alternatively, the account may be charged off. Also, the customer's account may be removed from the payment plan and the appropriate parameters associated with the payment plan eliminated, including the new segment. In one configuration, the balance associated with the new segment may be transferred back to the primary segment's balance.

If, however, an appropriate payment is received within the specified time period (Step 410; YES), financial account provider 1200 may adjust the customer's account parameters associated with the new segment to reflect the received payment (Step 420). Also, the payment plan parameters associated with the new segment may be adjusted. For example, suppose a payment plan member has a new segment that includes $400 of transferred penalty fees and a primary segment with an outstanding balance of $500 after the penalty fees were removed. Further, suppose that the payment plan called for a payment of $75 within 14 days of becoming a member and payments of $50 every 20 days following the first payment. Financial account provider 1200 may determine whether at least a payment of $75 was credited to the customer's credit account before the 14 day period expired. If such a payment was received on time, the payment may be credited directly to the outstanding balance of the new segment. Therefore, assuming no interest charges applied to the new segment, the outstanding balance may be modified to reflect $325. Furthermore, parameters associated with the new segment may also be adjusted, such as a time period indicator that reflects when the next payment may be due, such as in this example, 20 days from the due date of the first payment. One skilled in the art can appreciate that the above example is not intended to be limiting and financial account provider 1200 may apply payments to the primary and new segments in proportional amounts, such as 20% and 80%, respectively. Alternatively, interest charges may be assessed to the new segment, or the customer's account may be charged one or more membership fees.

After adjusting the parameters, financial account provider 1200 may determine whether a subsequent payment is necessary based on the parameters associated with the new segment and/or the primary segment (Step 430). For example, financial account provider 1200 may determine whether the balance associated with the new segment is below a threshold value or equal to zero to determine whether subsequent payments are required. If so (Step 430; YES), the monitor process determines whether the next payment has been received within the specified time period (Step 410), and Steps 420 and 430 are repeated until no further payments are necessary (e.g., the outstanding balance for the new segment is zero). At Step 460, once the customer has made all of the necessary payments as required under the payment plan, financial account provider 1200 may reset the customer's account to a previous status with previous parameters and the monitor process ends (Step 480).

In one embodiment of the present invention, the customer's financial account may previously have been in good standing, whereby the primary segment does not have an outstanding balance above a determined credit limit and there has been no past due fees charged to the customer's account within a pre-selected period of time, such as 3 months. Alternatively, the account status may still have an overlimit condition. That is, there may be situations where a customer may pay off past due penalty fees while a member of the payment plan, yet when completed, there may be an overlimit condition based on charges that exceeded the primary segment's credit limit. In this exemplary scenario, the customer's account may still be in delinquent status based on the overlimit condition, and financial account provider 1200 may begin charging overlimit fees after the monitoring process has ended. The customer may attempt to re-enroll in the program to attempt payments on the newly charged penalty fees. Financial account provider 1200, however, may take performance on the payment plan into consideration when determining whether such a customer would be included in the target customer base. Further, financial account provider 1200 may perform various other tasks associated with customers who successfully completes the payment plan, including but not limited to, adjusting the customer's credit limit, interest rates, fees, and the like.

As described, methods, systems, and articles of manufacture consistent with embodiments of the present invention enable credit card customers who have credit card accounts that have accumulated penalty fees to reestablish a good account standing by joining a payment plan offered by the financial account provider. The payment plan may allow the customer an opportunity to pay off outstanding penalty fees while not having such penalty fees, or other types of fees, charged to their account. Therefore, such methods, systems, and articles of manufacture enable a financial account provider to reduce the number of delinquent customers, while offering these customers payment options that enable them to get their accounts back into good standing with the financial account provider.

Although embodiments of the present invention have been described with reference to the exemplary system environment 1000 of FIG. 1, one skilled in the art can appreciate that various other configurations may be employed. Furthermore, the configurations of the payment plan itself, including parameters, segment formats, and processing thereof may be adjusted to meet the needs of the financial account provider and its customers, without departing form the spirit and scope of the present invention.

Other embodiments of the invention will be apparent to those skilled in the art from consideration of the specification and practice of the exemplary embodiments of the invention disclosed herein. For example, the process steps shown in FIGS. 2-4 are not limited to the sequences described above. Variations of these sequences, such as the removal and/or the addition of other steps may be implemented without departing from the spirit of the embodiments of the present invention. For example, financial account provider 1200 may apply a payment received proportionally to the new segment and the primary segment, based on the balance in the new segment. That is, suppose the new segment associated with a financial account has a balance of $50 and a payment of $150 is received to be credited to the account. Financial account provider 1200 may apply $50 of the $150 payment to the new segment and the remaining $100 to the primary segment associated with the financial account.

Additionally, the present invention may be applied to financial accounts other than credit card accounts. Any financial institution that provides financial accounts to customers may employ methods, systems, and articles of manufacture consistent with embodiments of the present invention. For example, a bank which provides financial loans to customers may have a customer who is delinquent on payments associated with a loan. The bank may be configured to offer a repayment plan to the customer and monitor the customer's account progress during the plan, in accordance with certain embodiments of the present invention.

Furthermore, although embodiments of the present invention are described as being associated with data stored in memory and other storage mediums, one skilled in the art can appreciate that these aspects can also be stored on or read from other types of computer-readable media, such as secondary storage devices, including: hard disks, floppy disks, or CD-ROM; a carrier wave from the Internet; or other forms of RAM or ROM. Accordingly, the specification is intended to be exemplary and the invention is not limited to the above described embodiments. Instead, the present invention is defined by the appended claims and their full scope of equivalents.

What is claimed is:

1. A computer-implemented method for managing a financial account, comprising:
   providing a payment plan offer to a customer associated with the financial account, the financial account comprising a first segment with a balance including at least one penalty fee;
   receiving a response from the customer indicating acceptance of the payment plan offer;
   creating, using a processor, a second segment associated with the financial account based on the response from the customer;
   applying, using the processor, the at least one penalty fee to a balance of the second segment and removing the at least one penalty fee from the balance of the first segment; and
   monitoring, using the processor, payment activity associated with the financial account during a predetermined time period.

2. The computer-implemented method of claim 1, wherein monitoring payment activity comprises:
   determining whether a predetermined payment is received within the predetermined time period, wherein the predetermined payment and the predetermined time period are indicated in the payment plan offer to the customer.

3. The computer-implemented method of claim 1, wherein the financial account is not charged additional penalty fees that the financial account would be eligible to receive during the predetermined time period.

4. The computer-implemented method of claim 1, further comprising:
   changing a status of the financial account from a delinquent status to a non-delinquent status based on a determination that a penalty fee balance is zero.

5. The computer-implemented method of claim 1, wherein the at least one penalty fee is a fee based on the existence of at least one of a past due payment and an overlimit charge to the financial account.

6. A system for managing a financial account, comprising:
   a processor; and
   a memory including a data structure reflecting the financial account, the data structure including:
   a first balance segment reflecting charges associated with transactions applied to the financial account, and
   a second balance segment reflecting fees charged against the financial account based on an occurrence of at least one predetermined event,
   wherein the processor is configured to execute a process that reduces the second balance by an amount equal to a first received payment based on a determination that the second balance is above zero.

7. The system of claim 6, wherein the process, when executed by the processor, applies a first portion of a second received payment to the second balance and a second portion of the second received payment to the first balance, wherein the first portion is equal to the second balance.

8. A computer-readable medium storing instructions for performing a method, when executed by a processor, the method comprising:
   providing a payment plan offer to a customer associated with a financial accoun the financial account comprising a first segment with a balance including at least one penalty fee;
   receiving a response from the customer indicating acceptance of the payment plan offer;
   creating, based on the response from the customer, a second segment associated with the financial account;
   applying the at least one penalty fee to a balance of the second segment and removing the at least one penalty fee from the balance of the first segment; and
   monitoring payment activity associated with the financial account during a predetermined time period.

9. The computer-readable medium of claim 8, wherein monitoring payment activity comprises:
   determining whether a predetermined payment is received within the predetermined time period, wherein the predetermined payment and predetermined time period are indicated in the offer to the customer.

10. The computer-readable medium of claim 8, wherein the financial account is not charged additional penalty fees that the financial account would be eligible to receive during the predetermined time period.

11. The computer-readable medium of claim 8, wherein the method further comprises:
   changing a status of the financial account from a delinquent status to a non-delinquent status based on a determination that a penalty fee balance is zero.

12. The computer-readable medium of claim 8, wherein the at least one penalty fee is a fee based on the existence of at least one of a past due payment and an overlimit charge to the financial account.

13. A a method for managing a financial account, comprising:
   receiving, from a server computer, a payment plan offer associated with the financial account, the financial account comprising a first segment with a balance including at least one penalty fee;
   providing a response indicating acceptance of the offer to the server computer, wherein, based on the response, a second segment associated with the financial account is created and the at least one penalty fee is applied to a balance of the second segment and the at least one penalty fee is removed from the balance of the first segment; and
   providing payment to an account provider that monitors payment activity associated with the financial account during a predetermined time period.

14. The method of claim 13, wherein the financial account is not charged additional penalty fees that the financial account would be eligible to receive during the predetermined time period.

15. The method of claim 13, wherein a status of the financial account is changed from a delinquent status to a non-delinquent status based on a determination that a penalty fee balance is zero.

* * * * *